Oct. 7, 1941.                J. J. POMERANZ                2,257,812
                           OPHTHALMIC MOUNTING
                           Filed Sept. 27, 1940
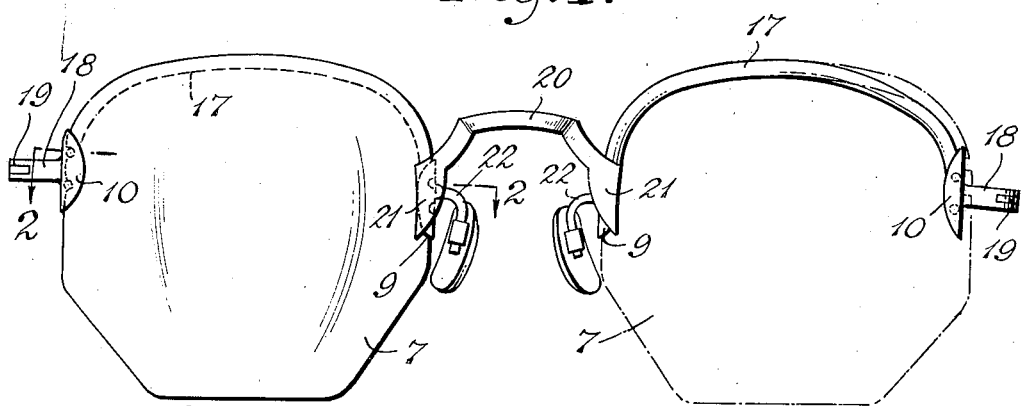
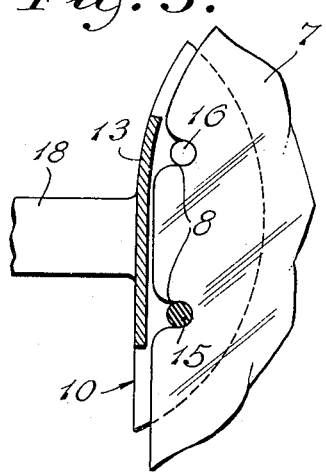
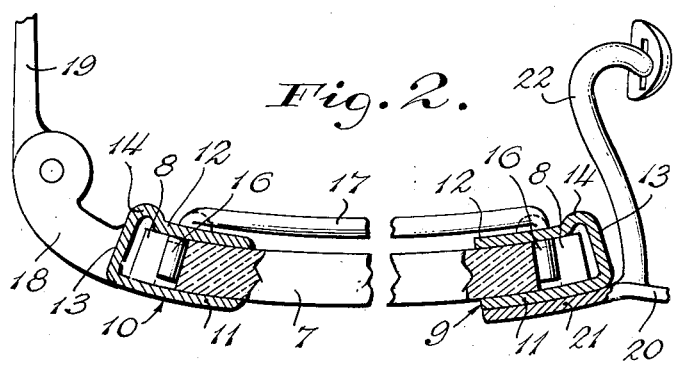
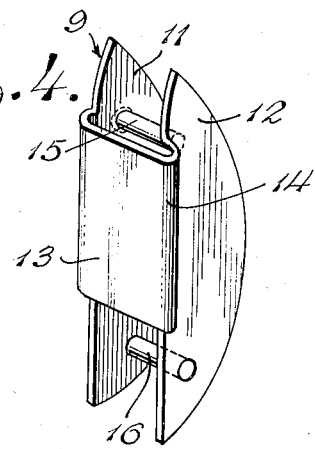
INVENTOR.
JACOB J. POMERANZ
BY
ATTORNEYS Patented Oct. 7, 1941

2,257,812

UNITED STATES PATENT OFFICE 2,257,812

OPHTHALMIC MOUNTING

Jacob J. Pomeranz, Brooklyn, N. Y.

Application September 27, 1940, Serial No. 358,587

4 Claims. (Cl. 88—47)

This invention relates to improvements in ophthalmic mountings and has particular reference to a lens securing means therefor.

An object of the invention is to provide an improved mounting of simple, practical and economical construction, which will enable the lenses of a pair of eyeglasses to be readily secured in position without the use of the customary screws employed to pierce the lenses.

Another object is to enhance the appearance of the mounting by utilizing portions of the bridge thereof to conceal, at least partially, lens supporting members to which are also attached the brow arms of the mounting.

A further object is to employ, as supporting means for a lens, a channel member adapted to fit over the peripheral edge of said lens and to provide one of the opposed walls of said member with a lens-retaining element that projects into a recess formed in said lens edge and extends to a point short of the opposite wall of said member so as to prevent relative movement between the lens and its mounting and also permit of adjustment of the walls to vary the effective width of the channeled member for the purpose of accommodating lenses of different thickness.

The above and other objects will appear more clearly from the following detailed description when taken in connection with the accompanying drawing which illustrates a preferred embodiment of the inventive idea:

In the drawing:

Figure 1 is a front elevation of an ophthalmic mounting constructed in accordance with the invention, a portion of the mounting being shown in the position it assumes with respect to a lens before the final step of securing said lens to the mounting.

Figure 2 is an enlarged horizontal section on the line 2—2 of Figure 1.

Figure 3 is a fragmentary vertical section through one of the outer lens supporting members.

Figure 4 is a perspective view of one of the lens supporting members.

Referring more particularly to the drawing, the numeral 7 indicates the lenses of a pair of eyeglasses. Each of these lenses is provided on the inner and outer edges thereof with spaced recesses 8 extending inwardly from the periphery of the lens to form locking means therefor in combination with the inner and outer complemental lens supporting members, generally indicated by the numerals 9 and 10. Each of these members is of channel formation and made of bendable material and comprises the front and rear walls 11 and 12, adjacent edges of which are connected by the intermediate wall 13 that is of less length than the first named walls so that ends of the latter project beyond the ends of said wall 13. The walls 11 and 12 may be of any desired configuration and are here shown as having their outer edges curved. The space between the walls 11, 12 is of a width sufficient to snugly receive the peripheral portion of the lens 7 and, in order to facilitate varying the effective width of the supporting member, one edge 14 of the connecting wall 13 is extended outwardly beyond the wall 12 and rolled so as to provide additional material which will enable the wall 12 to be adjusted slightly toward and away from the wall 11 and still maintain the parallel relation between said walls. Each lens supporting member is provided with lens-retaining means adapted to engage in adjacent recesses 8 formed in the periphery of the lens. In the preferred form, these lens-retaining means comprise a pair of pins 15 and 16 which extend laterally from the inner surfaces of the opposed walls 11, 12, respectively, adjacent the ends thereof. These pins 15, 16 are of such length that the free ends thereof terminate short of the wall opposed to that to which the pins are attached so that should it be desired to lessen the width of the space between the front and rear walls to properly accommodate a thinner lens, the adjustment of said walls may be accomplished without the interference of said pins. It will be obvious that, instead of having one pin attached to each of the walls 11 and 12, both pins may extend from one of the walls so as to engage in the recesses 8 to thereby prevent any possible shifting of the lens in the mounting which would tend to displace the horizontal axis of the lens from its proper position.

The two lens supporting members 9, 10 for each lens are connected by a resilient brow arm 17 the extremities of which are secured, by soldering or otherwise, to the rear walls 12 of said members, and by reason of its attachment to said walls, said arm will be disposed in a plane to the rear of the lens 7 and closely adjacent thereto, the brown arm being so formed as to conform to the curvature of the upper edge of the lens. To the intermediate connecting wall 13 of the outer supporting member 10 there is joined the usual end piece 18 to which is connected one of the temples 19 of the mounting.

A bridge piece 20 is utilized to connect the two brow arms of the mounting and, in accordance with the present invention, the enlarged end portions 21 of said bridge are secured to the front walls 11 of the two inner lens supporting members 9. The area of each of the enlarged portions 21 is greater than that of the front wall 11 and when said portion 21 is attached to said wall it is so arranged with respect thereto that at least the major portion of the area of said walls is covered by said portion and therefore concealed by it. With the ends of each brow arm thus secured to the rear walls of the supporting members 9, 10, and the front wall 11 of each member 9 being concealed by an end portion 21 of the bridge, as described, it will be evident that the mounting will present a neat appearance and that the ends of the brow arms and the supporting members 9 will be inconspicuous. Attached to and extending rearwardly from the inner edge of each of the portions 21 of the bridge, is the customary nose pad arm 22.

The procedure in mounting a lens in position is to first engage its inner edge in the channel member 9 so that the pins 15, 16 will extend into the recesses 8 in the lens. When this step has been accomplished, the brow arm and outer supporting member 10 will assume the position relative to the lens shown at the right of Figure 1. The outer end of the brow arm is then flexed so as to engage the channel member 10 over the peripheral edge of the lens and when the stress applied to flex the same is released, the resiliency of the arm will cause the lens edge to enter completely into the channel of the supporting member so that the pins 15, 16 will engage in the adjacent recesses 8 of the lens and be held in such position by the tension of the brow arm.

What is claimed is:

1. An ophthalmic mounting comprising, in combination, a pair of lenses having spaced recesses in the peripheral edges thereof, channeled supporting members each fitting over the edge of one of the lenses and having front and rear walls, a lens retaining element extending from each of said walls and terminating short of the opposed wall for engagement in one of the recesses in said lens, resilient brow arms each having one end secured to the rear wall of one of said supporting members, a bridge connecting said arms and having end portions secured to the outer surfaces of the front walls of said supporting members and being of greater area than said front walls, and other lens supporting members at the opposite ends of said brow arms.

2. An ophthalmic mounting comprising, in combination, a pair of lenses having spaced recesses in the peripheral edges thereof, channeled supporting members each fitting over the edge of one of the lenses and having front and rear walls bendable relative to each other to vary the effective width of said channel member, a connecting wall joining said front and rear walls with one edge of said connecting wall having an outwardly rolled portion merging into one of the other walls to allow for a spreading of the latter walls, a lens-retaining element extending from each of said front and rear walls and terminating short of the opposed wall and engaging in one of the recesses in said lens, resilient brow arms each having one end secured to the rear wall of one of said supporting members, a bridge connecting said arms and having end portions secured to the outer surfaces of the front walls of said supporting members and being of greater area than said front walls, and other lens supporting members at the opposite ends of said brow arms.

3. An ophthalmic mounting comprising, in combination, a pair of lenses having spaced recesses in the peripheral edges thereof, channeled supporting members each fitting over the edge of one of said lenses and having front and rear walls each provided with a lens-retaining pin extending therefrom in the direction of the opposed wall and terminating short thereof, said pins engaging in recesses in said lens, resilient brow arms having their inner ends secured to the rear walls of said supporting members and extending rearwardly of said lenses, a bridge connecting said supporting members, and other lens supporting members at the outer ends of said arms.

4. An ophthalmic mounting comprising, in combination, a pair of lenses having spaced recesses in the peripheral edges thereof, channeled supporting members each fitting over the edge of one of said lenses and having front and rear walls movable relative to each other to vary the effective width of the member, a connecting wall between said front and rear walls and having one of its edges provided with a rolled portion merging into one of the latter walls, lens-retaining elements extending laterally from said front and rear walls and into said recesses, brow arms carried by said supporting members, and a bridge connecting said supporting members.

JACOB J. POMERANZ.